(12) United States Patent
Labunets et al.

(10) Patent No.: US 11,258,802 B2
(45) Date of Patent: *Feb. 22, 2022

(54) CROSS-SITE COLLECTION QUERIES

(71) Applicant: Microsoft Technology Licensing, LLC, Redmond, WA (US)

(72) Inventors: Anton Yuriyovych Labunets, Bothell, WA (US); Andy C. Yan, Bellevue, WA (US); Marc Mroz, Redmond, WA (US); Steven Francis Boyle, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

This patent is subject to a terminal disclaimer.

(21) Appl. No.: 16/530,202

(22) Filed: Aug. 2, 2019

(65) Prior Publication Data

US 2019/0356671 A1 Nov. 21, 2019

Related U.S. Application Data

(63) Continuation of application No. 15/191,437, filed on Jun. 23, 2016, now Pat. No. 10,404,715.

(51) Int. Cl.
*H04L 29/06* (2006.01)
*G06F 21/60* (2013.01)

(52) U.S. Cl.
CPC .......... *H04L 63/105* (2013.01); *G06F 21/604* (2013.01); *H04L 63/104* (2013.01); *H04L 63/1408* (2013.01)

(58) Field of Classification Search
CPC .... G06F 16/94; G06F 16/9535; G06F 21/604; G06F 21/6218; G06F 21/6245; H04L 63/10; H04L 63/101; H04L 63/102; H04L 63/104; H04L 63/105; H04L 63/1408–1425; H04L 63/20–205; H04L 2209/60; H04L 2209/603
See application file for complete search history.

(56) References Cited

U.S. PATENT DOCUMENTS

| | | | |
|---|---|---|---|
| 2006/0265396 A1* | 11/2006 | Raman | H04L 63/101 |
| 2012/0054636 A1* | 3/2012 | Robertson-Hodder | G06F 16/93 715/748 |
| 2017/0364696 A1* | 12/2017 | Zhou | G06F 16/2308 |

* cited by examiner

*Primary Examiner* — Kevin Bechtel
(74) *Attorney, Agent, or Firm* — Leonard J. Hope; Newport IP, LLC

(57) ABSTRACT

Providing users of an enterprise content management (ECM) system with faster and more accurate results to queries related to permission levels within the ECM system are provided by systems and methods described herein. Network traffic passing through the ECM system is listened to for changes to permission levels that a permissions manager uses to build a permissions index that is operable to provide users with up-to-date permissions levels when they interact with the ECM system.

20 Claims, 7 Drawing Sheets

CROSS-SITE COLLECTION QUERIES

CROSS-REFERENCE TO RELATED APPLICATIONS

This application is a continuation of U.S. application Ser. No. 15/191,437 filed Jun. 23, 2016, and now U.S. Pat. No. 10,404,715, which the disclosure is hereby incorporated by reference in its entirety.

BACKGROUND

A enterprise content management (ECM) platform provides an organizational structure in which individual users may share and collaborate on electronic files over the Internet. Examples of ECM platforms include, but are not limited to: Alfresco™ (available from Alfresco Software, Inc. of Atlanta, Ga.) Huddle™ (available from Huddle, Inc. of London, UK) Google Drive™ (available from Alphabet, Inc. of Mountain View Calif.), WordPress™ (available from Automattic, Inc. of San Francisco, Calif.), and SharePoint® (available from Microsoft, Corp. of Redmond, Wash.). The electronic files stored according to the organizational structure of a given ECM platform may be held according to various "folders" or "sites" that depend from one another and from a "root" or "top-level site" in a tree structure. Different organizational "trees" may be referred to as a "site collection," and each site collection will include one root/top-level site, one or more folders/sites as nodes (e.g., leaves and branches) in the structure in a shared ownership and administrative environment.

Individual users may access the files stored at a given node in a given site collection to which they have permissions to access, but may also access files stored in several different site collections, which may have different owners or administrative settings than the first site collection. User permissions related to files may include permissions to Read, Write, or Administrate (e.g., rename, move, delete), and may differ from site collection to site collection and node to node. When working from one site collection, and seeking to interact with another site collection, learning of the permissions for the given user relies on the search function to periodically crawl the permissions from the nodes to which the user is connected. This process is computationally intensive, and prone to lag in its results; users learn of changes to their permission levels based on the speed of the crawler, which can provide incorrect results for several minutes or cause hangs and slowdowns on a local machine when a crawl is initiated.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

The present disclosure provides systems and methods that provide a faster and more flexible way for users to learn of and interact with multiple site collections in an enterprise content management (ECM) platform based on their permission levels that does not rely on a crawl by a search function. Each site collection includes an event monitor that updates a permissions manager that indicates the permissions of users to various nodes in the site collection when those users' permissions are modified. The permissions manager is queried by the user's client so that the client application will know of the correct permissions for the user and user interfaces (UI) can display the nodes to which the user has the relevant permissions. Various UI interfaces and controls (some examples of which are described herein) may make use of the permissions manager to improve the efficiency at which users browse and interact with files in the ECM platform with improved efficiency (i.e., with reduced latency and expenditure of computing resources) for the systems themselves.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
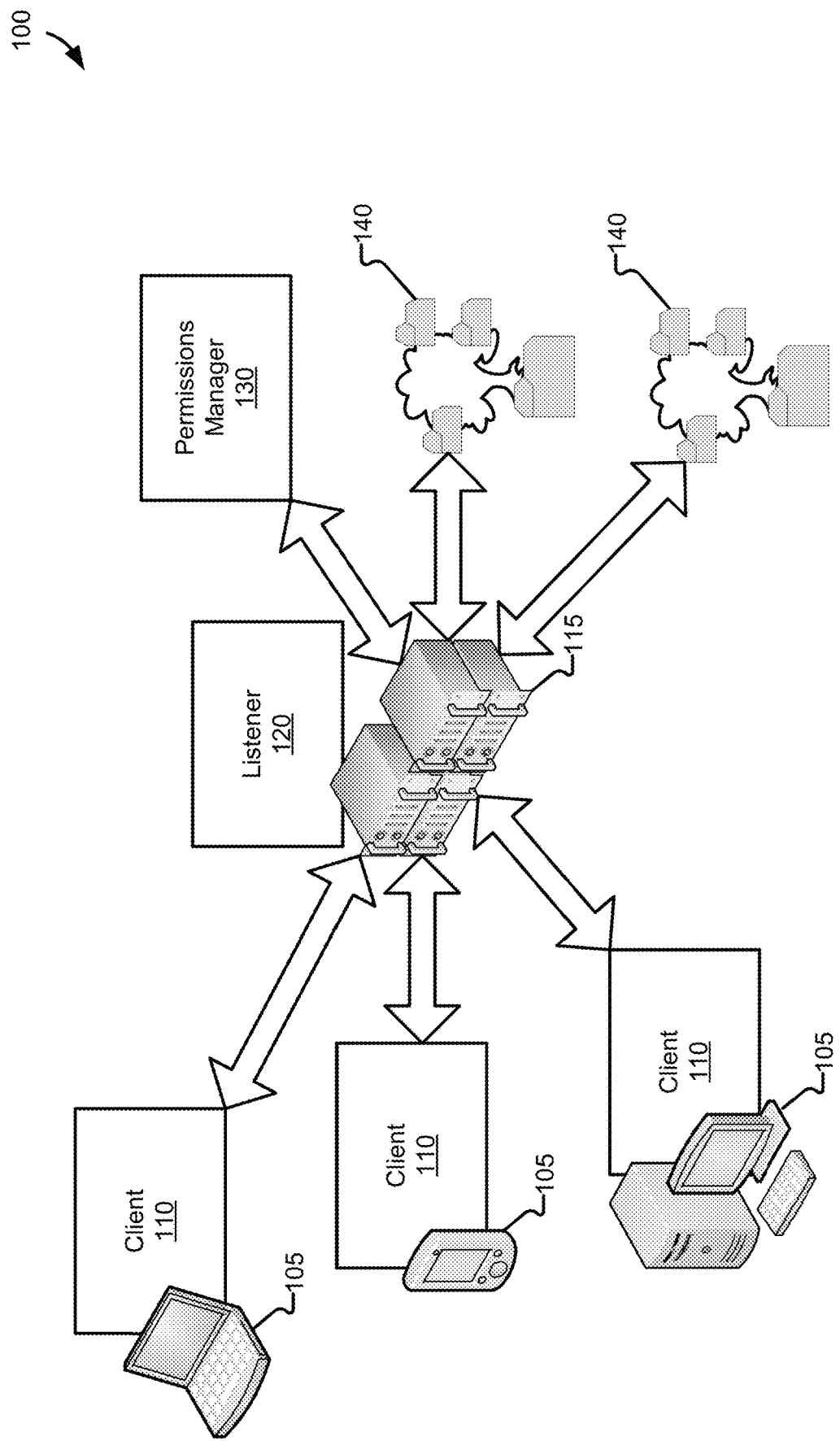
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

The present disclosure sets out systems and methods that may be used in addition to or instead of a crawl by a search feature that discovers user permissions to Read, Administrate, or Write (collectively, RAW permissions) to enable users to interact with an Enterprise Content Management (ECM) platform at various permission levels faster and more efficiently.

FIG. 1 illustrates an example environment 100 in which the present disclosure may be practiced. As illustrated, a plurality of user devices 105 each run a client 110 for an ECM platform that is hosted on an ECM server 115. The clients 110 enable the users to access one or more site collections 140, which comprise several sites/folders/nodes in which files are stored in the ECM platform. Users are granted (or denied) access to the files in the site collections 140 based on their permissions in a given site collection 140. These permissions are managed by the owner of each site collection 140. A listener 120 run on the ECM server 115 listens to network traffic passing through the ECM platform for events that change permissions each site collection 140, and a permissions manager 130 stores and indexes the permissions of each user as items therein. The permissions manager 130 communicates to clients 110 the identifiers of various site collections 140 so that the clients 110 can provide the users with access to the site collections 140 to which they have the desired permission levels.

The user devices 105 and ECM server 115 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4, 5A, and 5B.

The listener 120 and the permissions manager 130 are illustrative of a program module run on the ECM platform or an external computing device in communication with the ECM platform. In various aspects, each user or site collection 140 may have an associated listener 120 and permission manager 130 or they may be shared amongst users/site collections 140 on the ECM platform. The listener 120 observes network traffic from administrators, authorized users, and the ECM platform that change permission levels for various users in various hosted site collections 140 or nodes thereof. Such network traffic may set a user's initial permissions or modify existing permission, and may be done in response to a detected security breach. For example, when a user normally has full RAW permissions, those permissions may be downgraded to just read permissions or to no permissions when the user supplies too many incorrect passwords or is otherwise deemed a security risk by the ECM platform (e.g., while waiting for a second, third, etc. authentication in a multi-factor authentication setup). The permissions manager 130 is updated with the new permissions levels for the users in the site collections, and it operable to provide the clients 110 with identifiers for site collections 140 for which the associated user has a given permission level to access and to provide the site collections 140 with identifiers for users who have various permission levels thereto.

The site collections 140 are a set of nodes for storing/accessing files hosted by the ECM server 115 that share an owner and administrative settings which are organized according to a tree structure (i.e., one node is "root," from which other nodes depend). In some aspects, the client 110 may be a web browser or a thin client operating on a web browser that access each nodes as web sites via the Internet.

Each site collection 140 may allow various users various permission levels to the entire site collection 140 or to certain nodes of the site collection 140. For example, a site collection 140 may be used to organize the documents and calendars for various workers at an organization active on a given project, to which only a subset of the employees who are active on the project are given full RAW permissions to the documents node, the managers of the active employees are given limited RAW permissions (e.g., read only) to the documents node, and all employees in the organization are given read and write permissions to the calendar node. In some aspects, the site collections 140 may include a public node that is viewable by users, who may use the client 110 to browse several site collections 140 (e.g., as a preview of the contents within the given site collection 140, an identifying image for the given site collection 140).

Users may be individually granted permissions to various site collections 140 or nodes thereof, or a group to which the user belongs may be granted permissions. Continuing the example above, a user "JohnDoe" may be assigned specific permissions under the identifier of "JohnDoe", or may belong to the group "Managers", which has been assigned the permissions. If another user, "JaneRoe", is added to the group "Managers", that user may use the permissions assigned to the group. In various aspects, permissions assigned or denied to the given user may override permissions assigned or denied to a given group to which the user belongs, and when a user belongs to multiple groups, either the most permissive or most restrictive permissions may be used by the ECM platform.

When a user is not recognized as a member of a given site collection 140 or does not belong to any groups on the site collection 140, in various aspects, the user is treated as a member of the "public" group. Some of the files hosted in the example site collection 140 may be public, so that users external to the organization (e.g., part of the public group) can follow the site to stay informed on the organization or the project. A public group may be set up to allow users who follow a public portion of the site collection 140 to keep it active as a frequent object in their clients 110, but only have limited read permissions to the example site collection 140.

The client 110, when it seeks to interact with the ECM platform, may specify a desired permission level at which the user seeks to use within the ECM platform. For example, a user may seek to view or open files, in which case a Read permission is desired, a user may seek to create or edit a file, in which case a Write permission is desired, or a user may seek to modify the location or metadata of a file, in which case an Administrate permission is desired. As will be appreciated, a user may specify one or more permissions comprising the RAW permissions model, or permissions according to a different permissions model (e.g., the Create Read Update Delete (CRUD) permissions model).

The permissions manager 130 will return the identifiers for site collections 140 or nodes to which the user has the relevant permissions so that the client 110 may provide for the selection of or access to those site collections 140 or nodes to the user. As will be appreciated, the permissions manager 130 may also work in reverse; providing identifiers for site collections 140 or nodes to which the user lacks the relevant permissions. As will be further appreciated, the permissions manager 130 may also provide identifiers for users who have permissions to a designated site collection 140 or node. The permissions manager 130 may return identifiers at several granularities, such as, for example, a site collection 140 may have its identifier returned if the site collection includes at least one node to which the user has a matching permission level, or may be returned only if the user's permission levels at all nodes match the permission level desired, or may be returned if the user's permission level set at the site collection level 140 (regardless of the individual nodes' permission) match the desired permission level. Similarly, individual files at a given node may have unique permissions that may be different than the node in which they are hosted, and the permissions manager 130 may maintain and track their permissions separately for finer grained permission seeking from the user.

Figure 2:
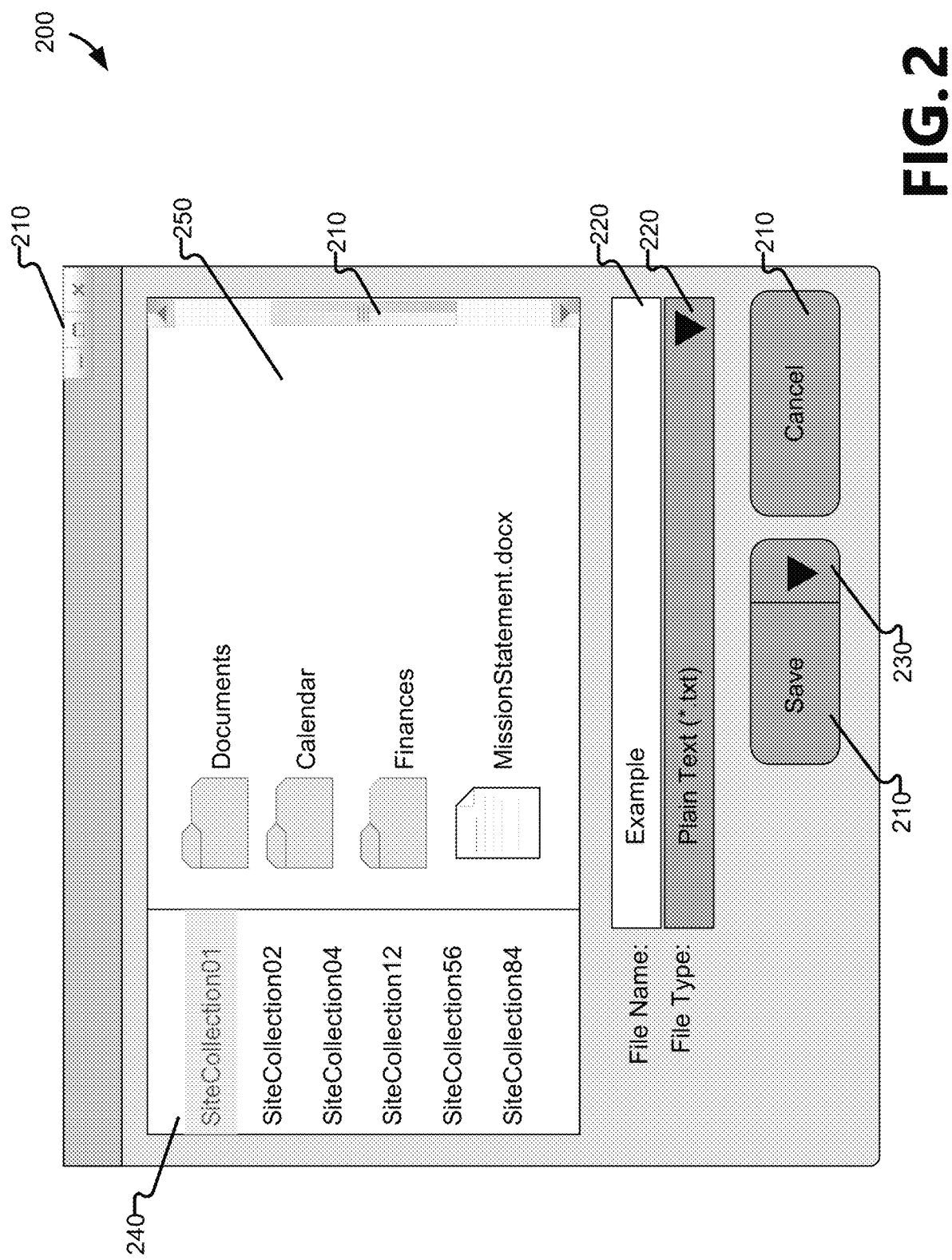
FIG. 2 illustrates an example user interface in which a user may interact with the enterprise content management platform via a client.

FIG. 2 illustrates an example user interface (UI) 200 in which a user may interact with the ECM platform via a client 110. Although the illustrated UI 200 is a save dialog, one of ordinary skill in the art will recognize that the features discussed herein may be applied in an open dialog or a browsing session among other use and interaction cases.

The UI 200 includes several UI controls 210, such as, but not limited to: close controls, minimize controls, maximize controls, downsize controls, cancel controls, apply controls, save controls, open controls, navigation controls (e.g., scroll bars, tabs, expand/collapse controls), etc., that will be familiar to one of skill in the art to manipulate and view different aspects of the UI 200. The UI 200 also includes several dialog-specific controls 220, which, depending on the dialog, may vary and may include, but are not limited to: filename controls, file type controls, overwrite controls (e.g., new version, replace old version, new file), open style controls (e.g., read-only, latest/archived version, co-authoring, new copy), etc., that will be familiar to one of skill in the art to manipulate how a given dialog will interact with the site collection 140.

Within the UI 200 is a permissions selector 230 by which a user may designate one or more permission levels at which the user wishes to contribute to a site collection 140. For example, a user may select from permissions to read, administrate, or write files. Depending on the permissions selected, the dialog-specific controls 220 may change, be added, or be removed to match the needs of the user in executing the desired contribution.

A site collection selector 240 is provided in the UI 200 to enable a user to view and select the site collections 140 to which the user has matching permissions to the designated permissions level. In various aspects, the site collections 140 included in the site collection selector 240 are filtered so that only the site collections 140 that the user follows (as a member of the public) or is a member of are included as possible site collections 140 for display in the site collection selector 240. The client 110 may display the site collections 140 matching the user's permissions as images of a public node, as text labels of names for the site collection 140 or their owners, or other identifiers set by the user for the site collections 140.

A node selector 250 is provided in the UI 200 to enable a user to navigate within a site collection 140 and specify a node at which to contribute to the site collection 140 selected from the site collection selector 240. In various aspects, the nodes and files within site collection 140 may be hidden from the user if the user lacks the requisite permissions to interact with those nodes or files or when the user or the designated permission from the permissions selector 230 to contribute to the node or file accordingly. In various aspects, the client 110 will not access (or exchange access tokens with) the site collections 140 (or beyond a public node thereof) until the user has selected a given site collection 140 from the site collection selector 240. Instead, the permissions manager 130 will provide the identifiers of the site collections 140 that match to which the user has designated permissions, thereby reducing the amount of communications needed to use the ECM platform, and improving the speed at which the user may navigate and gain access to site collections 140 hosted thereon.

Figure 3:
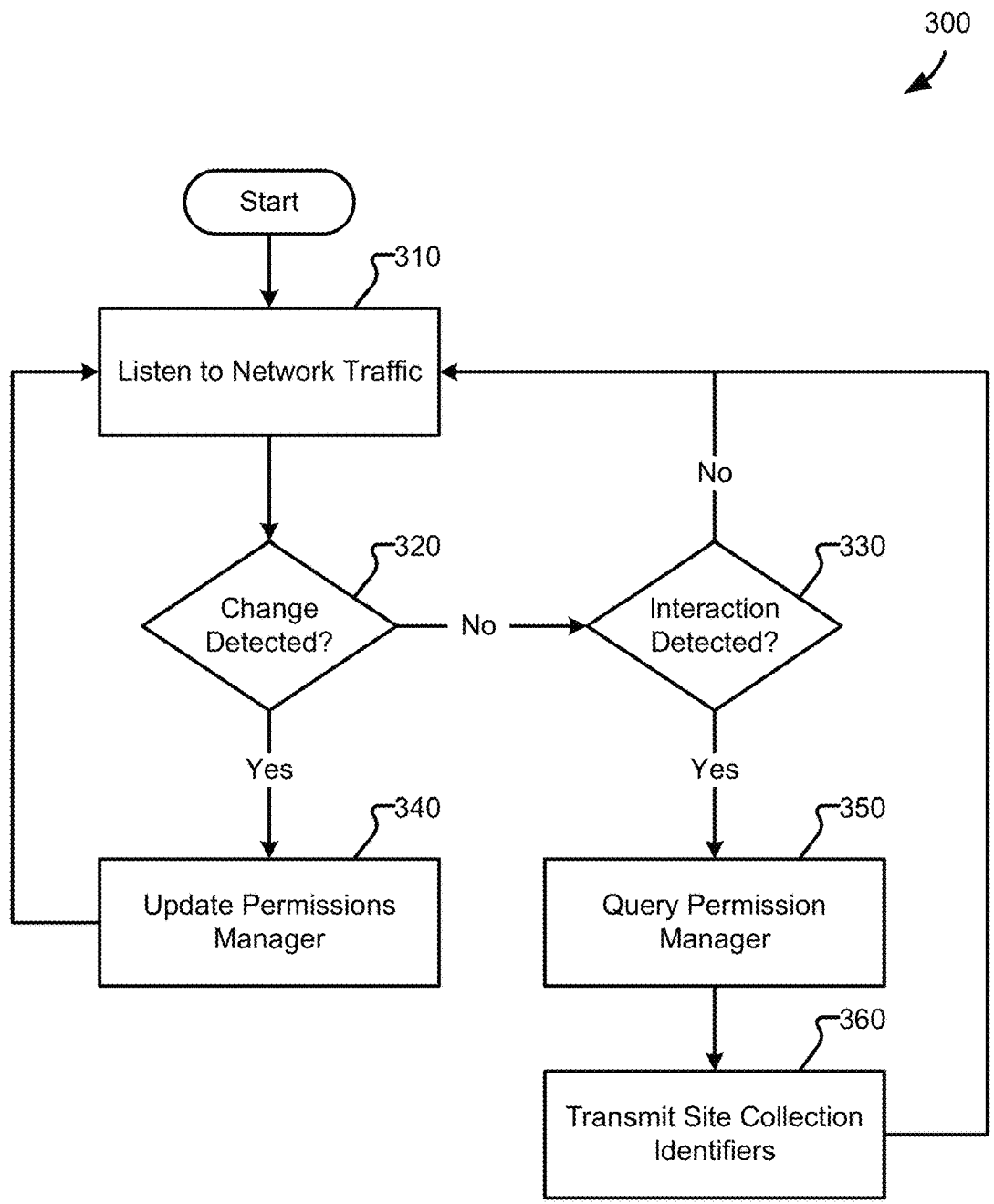
FIG. 3 is a flow chart showing general stages involved in an example method for managing access to site collections and improving the efficiency of interactions therewith in an enterprise content management platform.

FIG. 3 is a flow chart showing general stages involved in an example method 300 for managing access to site collections 140 and improving the efficiency of interactions therewith in an ECM platform. Method 300 begins at OPERATION 310, where the listener 120 listens to network traffic for various events and requests. The listener 120 will decide, at DECISION 320 and DECISION 330 respectively, whether the network traffic includes a change to the permissions for at least one user or whether a user interaction was detected.

At DECISION 320 it is determined whether a change to a user permission level for a site collection 140 has been detected by the listener 120. For example, an administrative user may manually change a given user's permissions (including adding permissions or a user), or the ECM platform may automatically adjust a given user's permissions (e.g., as a security response to a potential online attack). When a permission change event is triggered in the ECM platform and is observed by the listener 120, method 300 proceeds to OPERATION 340, otherwise method 300 proceeds to DECISION 330.

At OPERATION 340 the permissions manager 130 is updated with the changes to permission levels detected at DECISION 320. In various aspects, each user's permissions are stored as items in an index, such that the index may be queried according to the user, the permission level, or the site collection 140 and combinations thereof. For example, users may specify their identifiers (e.g., a username) and a designated permission level to learn of the site collections 140 to which they have the designated permission level. In another example, a user may specify the identifier of another user to learn which site collections 140 the other user has various permissions. In yet another example, a user may specify a site collection 140 and a designated permission level to learn which users have the designated permission level on that site collection 140. By updating the permission manager 130 in response to a permission change event, instead of initiating or waiting for a crawl of the available site collections 140, the computationally intensive crawl process may be avoided, and the users may learn of their permission levels faster and more accurately.

It is determined at DECISION 330 whether the network traffic indicated that a user interaction has been detected that specifies a desired permission level. If the network traffic is neither an interaction specifying a desired permission level nor a change to permission levels (e.g., traffic to upload/download files, ping requests, logins, password changes), method 300 will return to OPERATION 310. When it is determined that the network traffic comprises a interaction specifying a desired permission level, method 300 proceeds to OPERATION 350, where the permission manager 130 is queried for the interaction. Users may interact with the ECM server 115, for example, when they query the ECM server 115 to determine which site collections 140 (if any) they have a given permission level for or when they query the ECM server 115 for users of a given (or several) site collection(s) 140 that have a given set of permissions. As discussed in relation to FIG. 2, these queries may be made from dedicated dialogs for learning about permission levels, or may be integrated into other dialogs, such as, for example, a file save or file open dialog.

The permissions manager 130 will return and transmit the appropriate identifiers to the querying user from its index at OPERATION 360, and method 300 then returns to OPERATION 310, where subsequent network traffic is listened to for future permission level changes or interactions. As will be appreciated, the appropriate identifiers may be sent to the requesting user only when the requesting user has provided the appropriate credentials (e.g., a username and password, a security token) for access to the permissions manager 130, but may be done independently of the requesting user being logged into or otherwise accessing the individual site collections 140. The user device 105 may store the identifiers for use in a subsequent user interaction, in which case the listener 120 may be signaled to return to OPERATION 310 at DECISION 330 until the stored identifier reaches a timeout value and the user device 105 will request the listen to proceed to OPERATION 350 when an interaction is detected from the user device 105 so that the stored identifiers may be updated.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
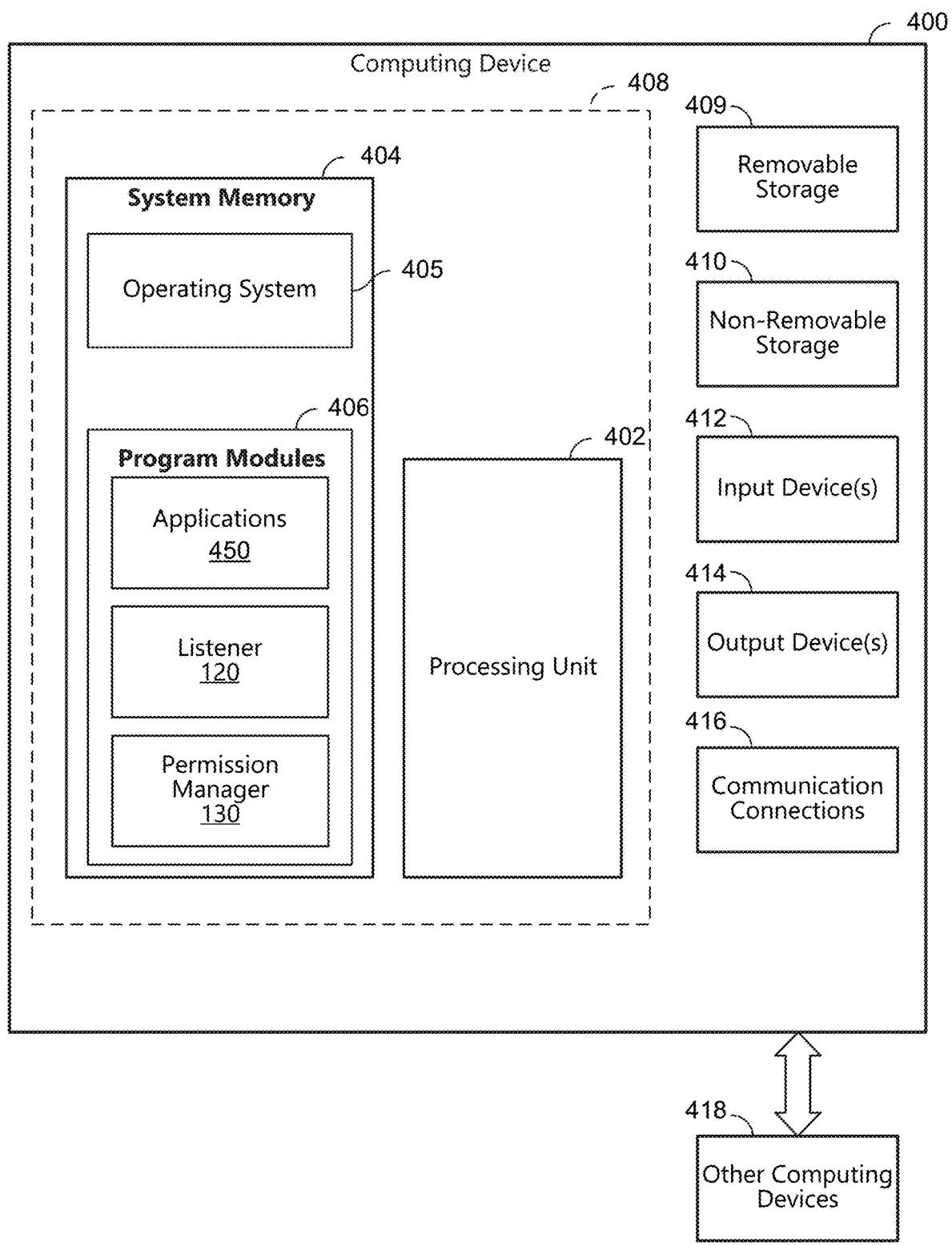
FIG. 4 is a block diagram illustrating example physical components of a computing device.
Figure 5A:
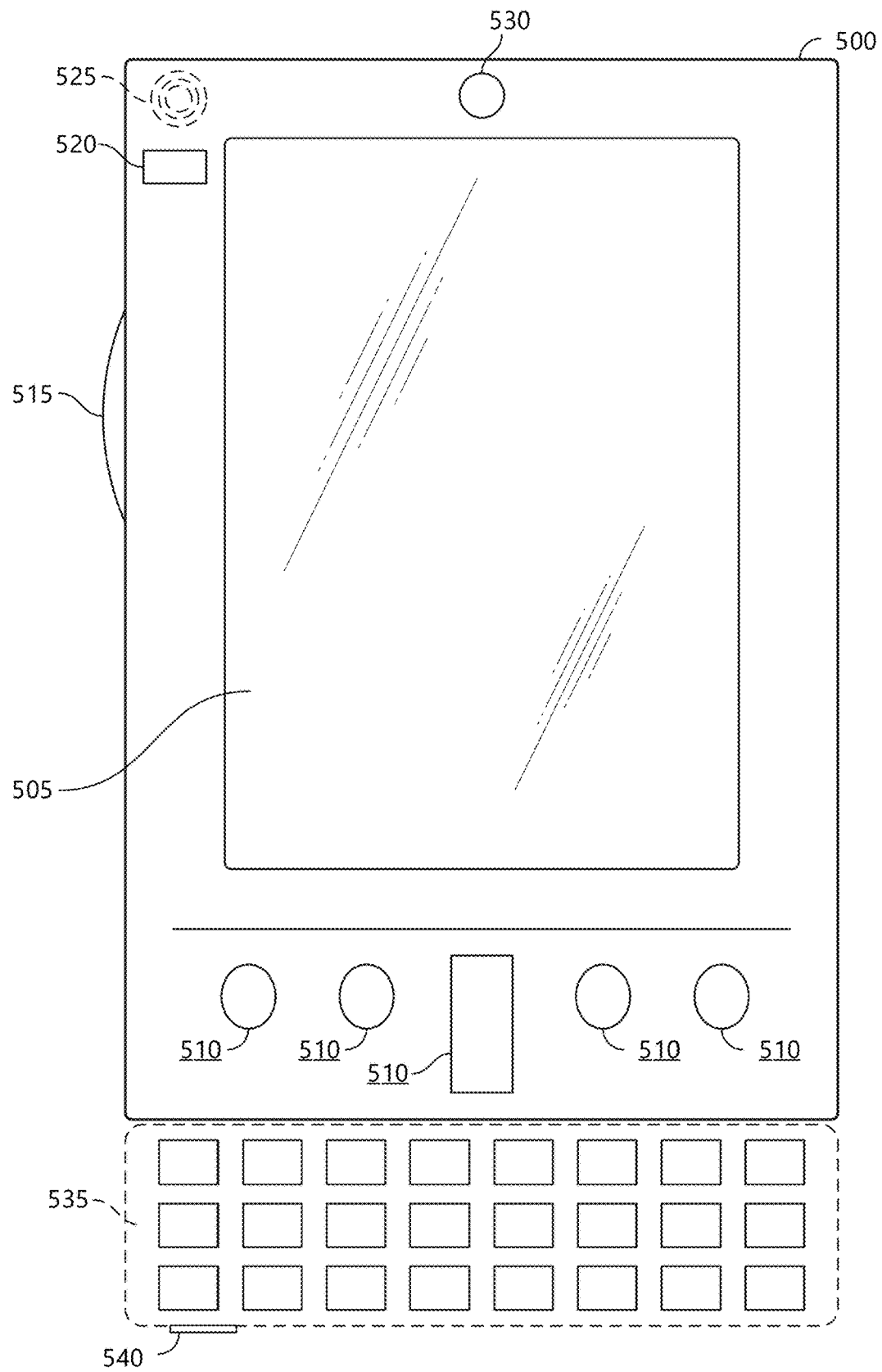
FIGS. 5A and 5B are block diagrams of a mobile computing device.
Figure 5B:
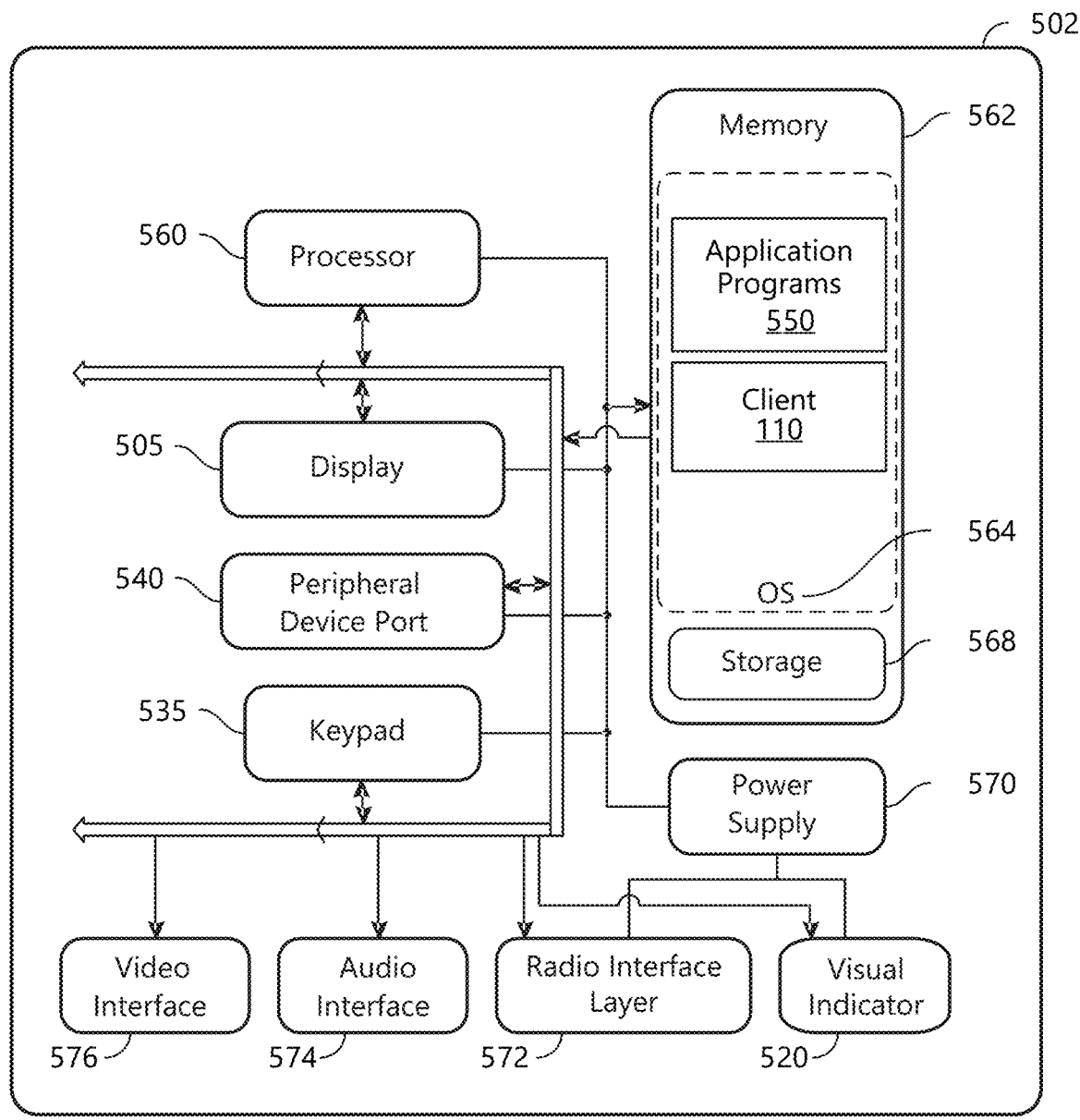
Figure 6:
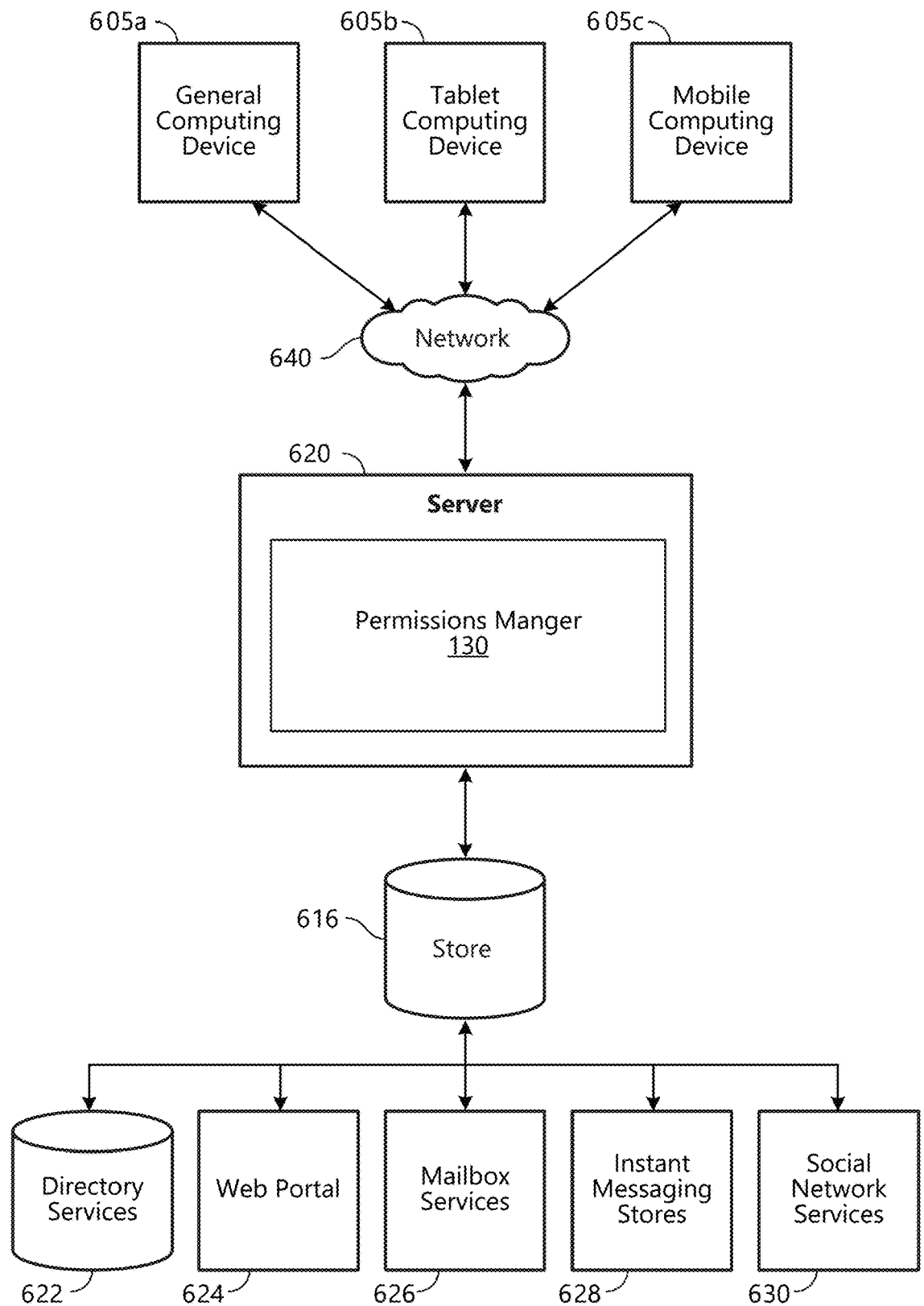
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404.

According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the listener 120 or permissions manager 130. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., listener 120, permissions manager 130) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, client 110 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for managing access to site collections 140 as described above. Content developed, interacted with, or edited in association with the permissions manager 130 is enabled to be stored in different communication channels or other storage types. For example, various documents may be stored using a directory service 622, a web portal 624, a mailbox service 626, an instant messaging store 628, or a social networking site 630. The permissions manager 130 is operative to use any of these types of systems or the like for managing access to site collections 140 and improving the efficiency of interactions therewith in an ECM platform, as described herein. According to an aspect, a server 620 provides the permissions manager 130 to clients 605*a,b,c*. As one example, the server 620 is a web server providing the permissions manager 130 over the web. The server 620 provides the permissions manager 130 over the web to clients 605 through a network 640. By way of example, the client computing device is implemented and embodied in a personal computer 605*a*, a tablet computing device 605*b* or a mobile computing device 605*c* (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for managing access to site collections within an Enterprise Content Management (ECM) platform, the method comprising:
   observing network traffic across the site collections hosted by the ECM platform;
   based on the observed network traffic, detecting a change in a permission setting at a site collection that affects a permission level associated with a user of the ECM platform;
   updating the permission setting for the site collection including the permission level associated with the user within an index;
   receiving, through a user interface of the ECM platform, an interaction with the ECM platform from the user, the interaction specifying a desired permission level;
   querying the index;
   based on the query, determining the site collection has a matching permission level to the desired permission level for the user; and
   providing for display an identifier for the site collection through the user interface of the ECM platform, wherein the identifier provides the user access to the site collection.

2. The method of claim 1, further comprising:
   receiving a selection of the identifier for the site collection displayed through the user interface of the ECM platform; and
   logging the user into the site collection responsive to the selection.

3. The method of claim 1, wherein the site collection includes a plurality of nodes, and determining the site collection has the matching permission level to the desired permission level for the user comprises:
   determining at least one node of the site collection has the matching permission level to the desired permission level for the user.

4. The method of claim 1, wherein the site collection includes a plurality of nodes, and determining the site collection has the matching permission level to the desired permission level for the user comprises:

determining each node of the site collection has the matching permission level to the desired permission level for the user.

5. The method of claim 1, wherein the site collection includes a public node, and the method further comprises:
providing for display the public node of the site collection through the user interface of the ECM platform.

6. The method of claim 5, wherein the site collection is accessed as a website, and receiving the interaction with the ECM platform from the user comprises:
receiving the interaction in a browsing session in which the public node of the site collection is displayed.

7. The method of claim 1, further comprising:
setting an initial permission level associated with the user of the ECM platform based on the observed network traffic.

8. The method of claim 1, wherein querying the index comprises:
querying the index according to one or more of the user, the desired permission level, or the site collection.

9. The method of claim 1, wherein querying the index comprises:
querying the index utilizing a dialog provided through the user interface of the ECM platform, the dialog including one of a dedicated dialog for learning about permission levels, a file save dialog, or a file open dialog.

10. The method of claim 1, wherein providing for display the identifier for the site collection through the user interface of the ECM platform comprises:
displaying the identifier for the site collection independently of whether the user is logged into the site collection.

11. The method of claim 1, further comprising:
providing an identifier for the user to the site collection.

12. A server for managing access to site collections within an Enterprise Content Management (ECM) platform, the server comprising:
at least one processor; and
a memory storing instructions that, when executed by the at least one processor, cause the at least one processor to:
observe network traffic across the site collections hosted by the ECM platform;
based on the observed network traffic, detect a change in a permission setting at a site collection that affects a permission level associated with a user of the ECM platform;
update the permission setting for the site collection including the permission level associated with the user within an index;
receive an interaction with the ECM platform from the user through a user interface of the ECM platform, the interaction specifying a desired permission level;
query the index;
based on the query, determine the site collection has a matching permission level to the desired permission level for the user; and
provide for display an identifier for the site collection through the user interface of the ECM platform, wherein the identifier provides the user access to the site collection.

13. The server of claim 12, wherein the detected change in the permission setting at the site collection is performed automatically by the ECM platform in response to a potential online attack on the ECM platform.

14. The server of claim 12, wherein the detected change in the permission setting at the site collection is performed manually by an administrator of the ECM platform to one of add permissions or add another user.

15. The server of claim 12, wherein the permission level is based on a group permission level for a group to which the user belongs on the site collection.

16. The server of claim 15, wherein the group to which the user belongs on the site collection is a public group to which users unknown to the site collection belong.

17. The server of claim 15, wherein when the user belongs to the group and has an individual permission level set within the site collection, the individual permission level overrides the group permission level for access by the user to the site collection.

18. The server of claim 12, wherein the desired permission level is a RAW permission level selected from:
a read permission;
an administrate permission; and
a write permission.

19. The server of claim 12, wherein the user interface of the ECM platform is executing on a client of the user, and the client of the user is operable to store the identifier for the site collection for use with subsequent interactions until a timeout value is reached.

20. Computer storage media including computer readable instructions, which when executed by a processor cause a method to be performed, the method comprising:
observing network traffic across site collections hosted by the ECM platform;
based on the observed network traffic, detecting a change in a permission setting at a site collection that affects a permission level associated with a user of the ECM platform;
updating the permission setting for the site collection including the permission level associated with the user within an index;
receiving, through a user interface of the ECM platform, an interaction with the ECM platform from the user, the interaction specifying a desired permission level;
querying the index;
based on the query, determining the site collection has a matching permission level to the desired permission level for the user; and
providing for display an identifier for the site collection through the user interface of the ECM platform, wherein the identifier provides the user access to the site collection.

* * * * *